(12) United States Patent
Yamaguchi

(10) Patent No.: US 8,866,584 B2
(45) Date of Patent: Oct. 21, 2014

(54) CONTROL DEVICE, CONTROL SYSTEM, CONTROL METHOD AND STORAGE MEDIUM

(75) Inventor: Tomoharu Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 882 days.

(21) Appl. No.: 12/669,505

(22) PCT Filed: Jul. 17, 2008

(86) PCT No.: PCT/JP2008/062894
§ 371 (c)(1),
(2), (4) Date: Jan. 18, 2010

(87) PCT Pub. No.: WO2009/014055
PCT Pub. Date: Jan. 29, 2009

(65) Prior Publication Data
US 2010/0194528 A1    Aug. 5, 2010

(30) Foreign Application Priority Data

Jul. 20, 2007    (JP) ................. 2007-189365

(51) Int. Cl.
| | |
|---|---|
| G06F 7/04 | (2006.01) |
| G06F 21/70 | (2013.01) |
| G06F 21/62 | (2013.01) |
| G06K 7/00 | (2006.01) |
| G06K 19/077 | (2006.01) |
| H04L 29/06 | (2006.01) |

(52) U.S. Cl.
CPC .............. *G06K 7/0008* (2013.01); *G06F 21/70* (2013.01); *G06F 21/629* (2013.01); *H04L 63/10* (2013.01); *G06K 19/07749* (2013.01)
USPC .............. 340/5.8; 340/1.1; 340/5.1; 340/7.33; 340/7.35

(58) Field of Classification Search
USPC .......................... 340/5.8, 1.1, 5.1, 7.33, 7.35
See application file for complete search history.

(56) References Cited

U.S. PATENT DOCUMENTS

| | | | |
|---|---|---|---|
| 5,907,804 A | 5/1999 | Schroderus et al. | |
| 6,465,880 B1 | 10/2002 | Dobashi et al. | |

(Continued)

FOREIGN PATENT DOCUMENTS

| | | |
|---|---|---|
| CN | 1161625 A | 10/1997 |
| DE | 10035598 A1 | 2/2002 |

(Continued)

OTHER PUBLICATIONS

Supplementary European Search Report for EP 08 70 1252 Issued Oct. 5, 2011.

(Continued)

*Primary Examiner* — George Bugg
*Assistant Examiner* — Naomi Small
(74) *Attorney, Agent, or Firm* — Sughrue Mion, PLLC

(57) ABSTRACT

To provide a control system capable of avoiding communication with an unintended external device when a number of external devices exist outside the device. A control system includes a control device 200 that controls at least one function, and at least one external device 900-1 to 900-n (n is an arbitrary integer) existing outside the control device 200. Further, the control device 200 counts a number of reception signals received from the external device 900-1 to 900-n and suspends communication with the external device 900-1 to 900-n according to the counted number of reception signals.

5 Claims, 8 Drawing Sheets

(56) References Cited

U.S. PATENT DOCUMENTS

| | | | |
|---|---|---|---|
| 6,497,359 B1* | 12/2002 | Chihara | 235/380 |
| 7,299,062 B2* | 11/2007 | Yi et al. | 455/511 |
| 7,538,655 B1* | 5/2009 | King | 340/5.51 |
| 7,792,180 B2* | 9/2010 | Ichikawa | 375/219 |
| 8,093,988 B2* | 1/2012 | Takene et al. | 340/5.7 |
| 2005/0026597 A1* | 2/2005 | Kim et al. | 455/412.1 |
| 2006/0022042 A1 | 2/2006 | Smets et al. | |
| 2006/0128308 A1* | 6/2006 | Michael et al. | 455/41.2 |
| 2006/0154680 A1* | 7/2006 | Kroth et al. | 455/515 |
| 2007/0194882 A1* | 8/2007 | Yokota et al. | 340/5.61 |
| 2008/0011835 A1* | 1/2008 | Kwon et al. | 235/382 |
| 2009/0023392 A1* | 1/2009 | Iizuka et al. | 455/65 |
| 2009/0201841 A1* | 8/2009 | Tachikawa | 370/310 |
| 2009/0215430 A1* | 8/2009 | Yi et al. | 455/410 |
| 2009/0275337 A1* | 11/2009 | Maeda et al. | 455/442 |

FOREIGN PATENT DOCUMENTS

| | | |
|---|---|---|
| JP | 4-288696 A | 10/1992 |
| JP | 2000142925 A | 5/2000 |
| JP | 2003296763 A | 10/2003 |
| JP | 2004322420 A | 11/2004 |
| JP | 2004364047 A | 12/2004 |
| JP | 2005141540 A | 6/2005 |
| JP | 2005159468 A | 6/2005 |
| JP | 2005165879 A | 6/2005 |

OTHER PUBLICATIONS

International Search Report for PCT/JP2008/062894 mailed Oct. 14, 2008.

Chinese Office Action for CN200880022145.4 issued Feb. 21, 2012.

\* cited by examiner

| CONDITIONS | DETAILS OF CONTROLS |
|---|---|
| CONDITION 1<br>NUMBER OF AUTHENTICATED DEVICES > 0,<br>NUMBER OF UNAUTHENTICATED DEVICES = 0 | ENABLE (ALL FUNCTIONS)<br>RESTRICTION (*) |
| CONDITION 2<br>(NUMBER OF AUTHENTICATED DEVICES ≠ 0)<br>< (NUMBER OF UNAUTHENTICATED DEVICES) | ENABLE (*)<br>RESTRICTION (FUNCTION A) |
| CONDITION 3<br>NUMBER OF AUTHENTICATED DEVICES = 0 | ENABLE (*)<br>RESTRICTION (ALL FUNCTIONS) |
| ... | |

| CONDITIONS | DETAILS OF CONTROLS |
|---|---|
| CONDITION 1<br>NUMBER OF AUTHENTICATED DEVICES = 0,<br>NUMBER OF UNAUTHENTICATED DEVICES = 0 | ENABLE (VOICE CALL)<br>RESTRICTION (TELEPHONE BOOK, USER-INTERFACE) |
| CONDITION 2<br>NUMBER OF AUTHENTICATED DEVICES > 0,<br>NUMBER OF UNAUTHENTICATED DEVICES = 0 | ENABLE (VOICE CALL, TELEPHONE BOOK, USER-INTERFACE)<br>RESTRICTION (*) |
| CONDITION 3<br>(NUMBER OF AUTHENTICATED DEVICES)<br>≧ (NUMBER OF UNAUTHENTICATED DEVICES ≠ 0) | ENABLE (VOICE CALL, USER-INTERFACE)<br>RESTRICTION (TELEPHONE BOOK) |
| CONDITION 4<br>(NUMBER OF AUTHENTICATED DEVICES ≠ 0)<br>< (NUMBER OF UNAUTHENTICATED DEVICES) | ENABLE (VOICE CALL)<br>RESTRICTION (TELEPHONE BOOK, USER-INTERFACE) |
| CONDITION 5<br>(NUMBER OF AUTHENTICATED DEVICES = 0)<br>< (NUMBER OF UNAUTHENTICATED DEVICES) | ENABLE (*)<br>RESTRICTION (VOICE CALL, TELEPHONE BOOK, USER-INTERFACE) |
| ... | ... |

CONTROL DEVICE, CONTROL SYSTEM, CONTROL METHOD AND STORAGE MEDIUM

TECHNICAL FIELD

The present invention relates to a control device, a control system, a control method and a storage medium having a control program recorded therein, and in particular, to a control device, a control system, a control method and a storage medium having a control program recorded therein capable of controlling communication according to the number of reception signals received from an external device existing in the periphery of the control device.

BACKGROUND ART

In recent years, the spread of communication devices such as mobile phone devices has been remarkable, and communication devices equipped with various functions have been used in various places.

It should be noted that recent communication devices have small sizes and light weights, and are easy-to-use and extremely user-friendly, so that communication can be freely carried out from any regions where communication by the communication device is possible.

However, if communication devices become more widespread in large quantity, it is inevitable, due to the increase in the quantity, that a large number of devices (external devices) will exist within the communication area of a communication device. As a result, it is inevitable that there are possibilities that data transmitted from a communication device could be received by an unintended external device.

Therefore, it is considered to be necessary to develop a control method to avoid communicating with an unintended external device when a larger number of external devices exist outside the device.

Note that as a technical document that was filed prior to the present invention, there is a document in which a technique to prevent unintended wireless tags from receiving data is disclosed (for example, see Patent document 1).

In the above-mentioned Patent document 1, the antennas of adjacent wireless tags arranged on a wireless tag tape are electrically connected with each other, so that data is written only to the intended wireless tag. In this way, other wireless tags are prevented from receiving the data.

Further, there is a document in which a technique enabling an owner to accept or refuse the reading of personal information of his/her own accord in a place where non-contact reading is possible is disclosed (for example, see Patent document 2).

In the above-mentioned Patent document 2, it includes a storage unit in which personal information is stored, a processing unit connected to this storage unit, a radio transmission unit that is connected to this processing unit and transmits personal information stored in the storage unit to a reader, and a radio reception unit that receives a feed signal from a reader. Further, when the processing unit receives a feed signal from the radio reception unit, the processing unit outputs a notice signal from a notice signal output unit. Further, it is configured to transmit personal information stored in the storage unit from the radio transmission unit to a reader after a predetermined time has elapsed since the notice signal was output. In this way, it enables an owner to accept or refuse the reading of personal information of his/her own accord in a place where non-contact reading is possible.

Further, identifying signals that are wirelessly transmitted by non-contact tags 5a to 5d are received by the respective detectors 4a to 4d. The respective detectors 4a-4d notify the identifying codes of the received identifying signals to a server 1. The server 1 counts the number of identifying codes notified from the respective detectors 4a to 4d and displays a list of count results. There is a document in which such a technique is disclosed (for example, Patent document 3).

Further, when a master wireless communication terminal MS receives a response packet from a slave wireless communication terminal SL, it stores attribute information of the slave wireless communication terminal in a memory. Then, after a predetermined time has elapsed, it selects slave wireless communication terminals SLs up to an allowable number Ks necessary to construct a network group NWG based on the attribute information stored in the memory. Then, it performs a predetermined calling process for the selected slave wireless communication terminals SLs to establish synchronization with each slave wireless communication terminal SL in the network group NWG. There is a document in which such a technique is disclosed (for example, Patent document 4).

Further, there is a document disclosing a technique in which an information processing device performs data communication with wireless communication terminals in the order in which the information processing device has detected the wireless communication terminals without waiting for a timeout (for example, Patent document 5).

In the above-mentioned Patent document 5, the information processing device transmits an inquiry packet inquiring whether or not any wireless communication terminal exists within the area where communication with the information processing device is possible, and a plurality of wireless communication terminals are detected one by one. Then, if it cannot detect any wireless communication terminal during the period from when the transmission of the inquiry packet was started to when a detection completion timeout period has elapsed, it finishes detecting wireless communication terminals. Further, when it detects a wireless communication terminal during the period from when the transmission of the inquiry packet was started to when a detection completion timeout period has elapsed, it suspends the above-described detection of a plurality of wireless communication terminals. Then, it performs wireless data communication with the above-described detected wireless communication terminal, and when it detects the completion of data communication, it resumes detecting other wireless communication terminals. In this way, data communication is performed with wireless communication terminals in the order in which the information processing device has detected the wireless communication terminals without waiting for the timeout.

Patent Document 1
Japanese Unexamined Patent Application Publication No. 2005-165879
Patent Document 2
Japanese Unexamined Patent Application Publication No. 2005-141540
Patent Document 3
Japanese Unexamined Patent Application Publication No. 2000-142925
Patent Document 4
Japanese Unexamined Patent Application Publication No. 2004-364047
Patent Document 5
Japanese Unexamined Patent Application Publication No. 2005-159468

DISCLOSURE OF INVENTION

Technical Problem

Note that the above-mentioned Patent documents 1 to 5 disclose techniques to send/receive data by performing wireless communication. However, they neither disclose anything about nor suggest its necessity for halting communication with an external device existing in the periphery of the device according to the number of reception signals received from the external device.

The present invention has been made in view of the above-mentioned circumstances, and an object thereof is to solve the above-described problems, i.e., to provide a control device, a control system, a control method and a storage medium having a control program recorded therein capable of avoiding communication with an unintended external device when a number of external devices exist outside the device.

Technical Solution

To achieve this object, the present invention has following features.

<Control Device>

A control device in accordance with the present invention is a control device that controls at least one function, including: count means for counting a number of reception signals received from an external device existing outside the control device; and communication control means for halting communication with an external device according to the number of reception signals counted by the count means.

<Control System>

A control system in accordance with the present invention is a control system including a control device that controls at least one function, and at least one external device existing outside the control device, wherein the control device includes: count means for counting a number of reception signals received from the external device; and communication control means for halting communication with an external device according to the number of reception signals counted by the count means.

<Control Method>

A control method in accordance with the present invention is a control method carried out in a control device that controls at least one function, including: a counting step to count a number of reception signals received from an external device existing outside the control device; and a communication controlling step to halt communication with an external device according to the number of reception signals counted in the counting step.

<Storage Medium Having Control Program Recorded Therein>

A storage medium having a control program recorded therein in accordance with the present invention is a storage medium having a control program recorded therein, the control program being adapted to be executed in a control device that controls at least one function and to cause the control device to perform: a counting process to count a number of reception signals received from an external device existing outside the control device; and a communication controlling process to halt communication with an external device according to the number of reception signals counted in the counting process.

Advantageous Effects

In accordance with the present invention, it becomes possible to avoid communication with an unintended external device when a number of external devices exist outside the device.

BEST MODE FOR CARRYING OUT THE INVENTION

Firstly, an outline of a control system in accordance with this exemplary embodiment of the present invention is explained hereinafter with reference to FIG. 1.

The control system in accordance with this exemplary embodiment is a control system including a control device 200 that controls at least one function, and at least one external device 900-1 to 900-$n$ (n is an arbitrary integer) existing outside the control device 200.

Further, the control device 200 counts the number of reception signals received from the external device 900-1 to 900-$n$ and halts communication with the external device 900-1 to 900-$n$ according to the counted number of reception signals.

In this way, when a number of external devices 900-1 to 900-$n$ exist outside the control device 200, communication with an unintended external device 900-1 to 900-$n$ can be avoided, and thus making it possible to improve the security. Details of a control system in accordance with this exemplary embodiment are explained hereinafter with reference to the drawings.

First Exemplary Embodiment

<System Configuration of Control System>

Firstly, a system configuration of a control system in accordance with this exemplary embodiment of the present invention is explained hereinafter with reference to FIG. 2.

The control system in accordance with this exemplary embodiment includes a control device 100 and an external device(s) 900-1 to 900-$n$ (n is an arbitrary integer).

The control device 100 is a device that controls at least one function 1. Further, the external device(s) 900-1 to 900-$n$ is a device(s) that communicates with the control device 100. Examples of the external device 900-1 to 900-$n$ include a wireless tag, an IC card, an access point, and a server device and the like.

Note that there are no particular restrictions on the connection relation between the control device 100 and the external device 900-1 to 900-$n$ in the control system in accordance with this exemplary embodiment, and any connection form regardless of whether it is wired or wireless can be applied.

<Internal Configuration of Control Device: 100>

Next, an internal configuration of a control device 100 in accordance with this exemplary embodiment the present invention is explained with reference to FIG. 2.

As shown in FIG. 2, the control device 100 in accordance with this exemplary embodiment includes an authentication unit 110, an authenticated device count unit 120, an unauthenticated device count unit 130, a function control unit 140, and a control condition retention unit 150.

The authentication unit 110 performs authentication of an external device(s) 900-1 to 900-$n$. The authentication unit 110 receives identification information of the external device 900-1 to 900-$n$ and information for authentication, and performs authentication of the external device 900-1 to 900-$n$ based on the received identification information and information for authentication.

Note that the identification information is information used to specify an external device 900-1 to 900-n. The authentication unit 110 specifies an external device 900-1 to 900-n based on identification information received from the external device 900-1 to 900-n. Note that any information that can be used to specify an external device 900-1 to 900-n can be applied as the identification information.

Further, the information for authentication is information used to verify the validity of an external device 900-1 to 900-n. The authentication unit 110 compares information for authentication retained by the authentication unit 110 with information for authentication received from the external device 900-1 to 900-n, and determines the external device 900-1 to 900-n as an authenticated device or an unauthenticated device according to the comparison result.

For example, when both the information for authentication retained by the authentication unit 110 and the information for authentication received from the external device 900-1 to 900-n are matched with each other, the authentication unit 110 determines that the external device 900-1 to 900-n can be authenticated. Then, the authentication unit 110 determines the external device 900-1 to 900-n as an authenticated device, and notifies the authenticated device count unit 120 accordingly.

Further, when both of the information pieces for authentication are not matched with each other, it determines that the external device 900-1 to 900-n cannot be authenticated. Then, the authentication unit 110 determines the external device 900-1 to 900-n as an unauthenticated device, and notifies the unauthenticated device count unit 130 accordingly. Note that any information that can be used to verify the validity of an external device 900-1 to 900-n can be applied as the information for authentication.

The authenticated device count unit 120 counts and retains the number of external devices that could have been authenticated by the authentication unit 110 (authenticated devices).

The unauthenticated device count unit 130 counts and retains the number of external devices that could not have been authenticated by the authentication unit 110 (unauthenticated devices).

As shown in FIG. 3, the control condition retention unit 150 retains "conditions" that are created based on the number of authenticated devices and the number of unauthenticated devices, and "details of controls" to control various functions 1 according to those "conditions" in such a manner that the "conditions" and the "details of controls" are associated with each other.

As shown in FIG. 3, examples of the "details of controls" include a function(s) that are controlled to the "enabled" in the control device 100 and a function(s) that are "restricted" in the control device 100.

The function control unit 140 controls various functions 1 according to the number of authenticated devices that can be authenticated by the authentication unit 110 and the number of unauthenticated devices that cannot be authenticated by the authentication unit 110.

Specifically, the function control unit 140 specifies, based on the number of authenticated devices retained by the authenticated device count unit 120 and the number of unauthenticated devices retained by the unauthenticated device count unit 130, the details of control corresponding to the condition for the number of authenticated devices and the number of unauthenticated devices by referring to the control condition retention unit 150 shown in the FIG. 3. Then, the function control unit 140 controls various functions by outputting a control signal indicating the specified details of control.

<Control Operation in Control Device: 100>

Next, control operations in the control device 100 in accordance with this exemplary embodiment are explained hereinafter with reference to FIGS. 2 and 3.

Firstly, when the authentication unit 110 receives identification information and information for authentication from an external device 900-1 to 900-n, it performs authentication of the external device 900-1 to 900-n based on the received identification information and information for authentication and determines whether the external device 900-1 to 900-n is an authenticated device or an unauthenticated device.

When the authentication unit 110 can authenticate the external device 900-1 to 900-n, it determines the external device 900-1 to 900-n as an authenticated device and notifies the authenticated device count unit 120 accordingly.

Further, when the authentication unit 110 cannot authenticate the external device 900-1 to 900-n, it determines the external device 900-1 to 900-n as an unauthenticated device and notifies the unauthenticated device count unit 130 accordingly.

Note that when the authentication unit 110 receives the same identification information twice or more times from an external device 900-1 to 900-n in a short time, the authentication unit 110 performs control such that notification to the authenticated device count unit 120 and the unauthenticated device count unit 130 is not carried out.

For example, the authentication unit 110 keeps track of authenticated external devices 900-1 to 900-n for which an authentication process was already carried out in the authentication unit 110 by managing the identification information received from the external devices 900-1 to 900-n for a certain time period. Then, if the authentication unit 110 receives the same identification information as identification information managed in the authentication unit 110 from an external device 900-1 to 900-n within the certain time period, the authentication unit 110 determines that that external device 900-1 to 900-n has been already authenticated. Then, the authentication unit 110 does not perform authentication of that external device 900-1 to 900-n, and performs control such that notification to the authenticated device count unit 120 and the unauthenticated device count unit 130 is not carried out.

In this way, the authentication unit 110 can perform control such that a validity/invalidity result for the authentication of the same external device 900-1 to 900-n is not notified to the authenticated device count unit 120 and the unauthenticated device count unit 130.

When the authenticated device count unit 120 receives a notice indicating that the external device 900-1 to 900-n authenticated in the authentication unit 110 is an authenticated device from the authentication unit 110, it retains the received notice in such a manner that received notices are accumulated in accordance with notification intervals from the authentication unit 110.

Further, when the unauthenticated device count unit 130 receives a notice indicating that the external device 900-1 to 900-n authenticated in the authentication unit 110 is an unauthenticated device from the authentication unit 110, it retains the received notice in such a manner that received notices are accumulated in accordance with notification intervals from the authentication unit 110.

Next, the function control unit 140 refers to the control condition retention unit 150 shown in FIG. 3 based on the number of authenticated devices retained by the authenticated device count unit 120 and the number of unauthenticated devices retained by the unauthenticated device count unit 130. Then, the function control unit 140 specifies details of control corresponding to a condition for the above-mentioned number of authenticated devices and the number of unauthenticated devices, and controls various functions 1 by outputting a control signal for the specified details of control.

For example, assume that the control condition retention unit 150 retains details of controls corresponding to "condition 1" to "condition 3" shown in FIG. 3.

[Condition 1]

If the number of authenticated devices is larger than or equal to 1 and the number of unauthenticated devices is 0, i.e., "number of authenticated devices>0, number of unauthenticated devices=0", all functions are enabled.

[Condition 2]

Even if the number of authenticated devices is larger than or equal to 1, if the number of unauthenticated devices is larger than the number of authenticated devices, i.e., "(number of authenticated devices≠0)<(number of unauthenticated devices)", a function "A" that involves an occurrence of costs is restricted.

[Condition 3]

If the number of authenticated devices is 0, i.e., "number of authenticated devices=0", all functions are restricted.

Based on the above-mentioned conditions, if the number of authenticated devices retained in the authenticated device count unit 120 is "2" and the number of unauthenticated devices retained in the unauthenticated device count unit 130 is "0", it corresponds to the "condition 1" shown in FIG. 3. In this case, the function control unit 140 performs control so as to enable all the functions.

Further, if the number of authenticated devices retained in the authenticated device count unit 120 is "2" and the number of unauthenticated devices retained in the unauthenticated device count unit 130 is "3", it corresponds to the "condition 2" shown in FIG. 3. In this case, the function control unit 140 performs control so as to restrict the function "A" that involves an occurrence of costs.

As described above, in the control device 100 in accordance with this exemplary embodiment, the authentication unit 110 performs authentication of an external device 900-1 to 900-n. Further, the authenticated device count unit 120 counts and retains the number of authenticated devices that can be authenticated by the authentication unit 110. Further, the unauthenticated device count unit 130 counts and retains the number of unauthenticated devices that cannot be authenticated by the authentication unit 110.

Then, the function control unit 140 specifies details of control according to the number of authenticated devices retained by the authenticated device count unit 120 and the number of unauthenticated devices retained by the unauthenticated device count unit 130 by referring to the control condition retention unit 150, and controls various functions 1 based on the specified details of control.

In this way, the control device 100 in accordance with this exemplary embodiment can control various functions according to validity/invalidity of the authentication of the external device 900-1 to 900-n existing outside the control device 100. As a result, it becomes possible to prevent other people from using the control device 100 without permission.

Note that examples of the various functions include following functions.

Function 1: Voice call function of carrying out a voice call by connecting to a subscriber network.

Function 2: Data communication function of carrying out data communication by connecting to a subscriber network.

Function 3: Radio communication function of carrying out radio communication (short-distance radio communication, proximity radio communication).

Function 4: Access function of accessing to various information pieces recorded in recording means (not shown).

Function 5: Delete function of deleting various information pieces recorded in recording means.

Function 6: Encryption function of encrypting various information pieces recorded in recording means.

Any means that can record various information pieces can be applied as the recording means, and examples of them include a memory such as a ROM, a RAM, a memory card, and an SD card. Further, any information pieces can be applied for the various information pieces, and examples of them include personal information, telephone book information, and schedule information and the like.

The personal information is information about the owner of the control device 100. The telephone book information is information such as telephone numbers and email addresses in regard to callers and recipients. The schedule information is information in regard to a schedule of the owner and the like.

Further, examples of conditions to control the above-mentioned various functions include following conditions.

Even if there is an authenticated device, if the number of unauthenticated devices is larger than a specific number, the function control unit 140 halts the voice call by controlling the voice call function.

If the number of unauthenticated devices is larger than the number of authenticated devices, the function control unit 140 halts the data communication by controlling the data communication function.

If the number of unauthenticated devices is larger than the number of authenticated devices, the function control unit 140 halts the radio communication (short-distance radio communication, proximity radio communication) by controlling the radio communication function.

If the number of unauthenticated devices is larger than the number of authenticated devices, the function control unit 40 prohibits accesses to various information pieces recorded in the recording means by controlling the access function.

If the number of unauthenticated devices is larger than the number of authenticated devices, the function control unit 140 deletes various information pieces recorded in the recording means by controlling the delete function.

If the number of unauthenticated devices is larger than the number of authenticated devices, the function control unit 140 encrypts various information pieces recorded in the recording means by controlling the encryption function. Note that the encryption is preferably carried out with encryption for which the owner of the control device 100 can carry out decryption.

As described above, the control device 100 in accordance with this exemplary embodiment retains details of controls corresponding to the number of authenticated devices and the number of unauthenticated devices in the control condition retention unit 150. Then, the function control unit 140 specifies details of control according to the number of authenticated devices and the number of unauthenticated devices by referring to the control condition retention unit 150, and controls various functions based on the specified details of control. In this way, the control device 100 in accordance with this exemplary embodiment can control various functions according to environmental situations of the control device 100.

EXEMPLARY EXAMPLES

Next, explanation is made by using an example where the above-described control device 100 is installed in a communication device 10 such as a mobile telephone device.

<Configuration of Communication Device: 10>

Firstly, a configuration in which the above-described control device 100 is installed in a communication device 10 is explained hereinafter with reference to FIG. 4.

The communication device 10 in accordance with this exemplary example includes a control device 100 shown in FIG. 2, a voice call function 11, a telephone book function 12, and a user-interface function 13.

The communication device 10 in accordance with this exemplary example represents an example to which a voice call function 11, a telephone book function 12, and a user-interface function 13 are applied as functions 1 to be controlled by the control device 100.

Further, assume that the communication device 10 performs communication in accordance with Bluetooth as a communication method of the authentication unit 110.

Further, assume also that the external devices 900-1 to 900-n are a headset, a personal computer, and the like, each of which is connectable in accordance with Bluetooth.

Further, assume also that a device number of Bluetooth is used as identification information that is received from the external devices 900-1 to 900-n by the communication device 10 and that information encrypted by a common key is used as information for authentication.

Therefore, each of the external devices 900-1 to 900-n retains a common key in advance, and when both the communication device 10 and the external device 900-1 to 900-n have the same common key, the communication device 10 determines that the external device 900-1 to 900-n can be authenticated. Then, it specifies the external device 900-1 to 900-n as an authenticated device.

Further, when the communication device 10 and the external device 900-1 to 900-n have different common keys from each other, the communication device 10 determines that the external device 900-1 to 900-n cannot be authenticated. Then, it specifies the external device 900-1 to 900-n as an unauthenticated device.

Note that as shown in FIG. 5, the control condition retention unit 150 in accordance with this exemplary example retains "conditions" that are created based on the number of authenticated devices and the number of unauthenticated devices and "details of controls" to control various functions according to the "conditions" in such a manner that the "conditions" and the "details of controls" are associated with each other.

As shown in FIG. 5, examples of the "details of controls" include a function(s) that are controlled to the "enabled" in the communication device 10 and a function(s) that are "restricted" in the communication device 10.

The function control unit 140 specifies, based on the number of authenticated devices retained by the authenticated device count unit 120 and the number of unauthenticated devices retained by the unauthenticated device count unit 130, the details of control corresponding to the condition for the number of authenticated devices and the number of unauthenticated devices by referring to the control condition retention unit 150 shown in the FIG. 5. Then, the function control unit 140 controls various functions 11 to 13 by outputting a control signal indicating the specified details of control.

For example, when only an external device(s) 900-1 to 900-n that can be authenticated by the common key of the communication device 10 exists and no external device 900-1 to 900-n that cannot be authenticated by the common key of the communication device 10 exists in the periphery of the communication device 10, i.e., "authenticated devices>0, unauthenticated devices=0", it corresponds to the "condition 2" shown in FIG. 5. In this case, the function control unit 140 makes all the functions of the communication device 10 available by controlling the voice call function 11, the telephone book function 12, and the user-interface function 13 to enable states.

Further, when no external device 900-1 to 900-n that can be authenticated by the common key of the communication device 10 exists in the periphery of the communication device 10, i.e., "authenticated devices=0", it corresponds to the "condition 1" shown in FIG. 5. In this case, the function control unit 140 restricts all the functions except for the voice call function 11, i.e., functions 12 and 13.

In this way, it is possible to configure the system such that even if a person other than the owner acquires the communication device 10, that person cannot use the telephone book function 12 and the user-interface function 13 and the like. As a result, it is possible to prevent accesses to the personal information, the telephone book information, and the schedule information and the like stored in the communication device 10.

Further, even if an external device(s) 900-1 to 900-n that can be authenticated exists in the periphery of the communication device 10, if the number of external devices 900-1 to 900-n that cannot be authenticated is larger than the number of the external devices 900-1 to 900-n that can be authenticated, i.e., "(number of authenticated devices≠0)<(number of unauthenticated devices)", it corresponds to the "condition 4" shown in FIG. 5. In this case, the function control unit 140 restricts all the functions except for the voice call function 11, i.e., functions 12 and 13.

In this way, when the communication device 10 is placed in an environment different from the environment that the owner administers under normal circumstances, the function control unit 140 restricts all the functions except for the voice call function 11, i.e., functions 12 and 13. Therefore, it is possible to configure the system such that, for example, even if both the communication device 10 and the external device 900-1 to 900-n are simultaneously left behind or stolen, any person other than the owner cannot use the telephone book function 12 and the user-interface function 13 and the like. In this way, it is possible to prevent accesses to the personal information, the telephone book information, and the schedule information and the like stored in the communication device 10.

Further, even if an external device(s) 900-1 to 900-n that cannot be authenticated exists in the periphery of the communication device 10, if the number of the external devices 900-1 to 900-n that cannot be authenticated is less than or equal to the number of the external devices 900-1 to 900-n that can be authenticated, i.e., "(number of authenticated devices≥(number of unauthenticated devices≠0)", it corresponds to the "condition 3" shown in FIG. 5. In this case, the function control unit 140 restricts only the telephone book function 12, and enables the functions other than the telephone book function 12, i.e., functions 11 and 13.

As described above, the communication device 10 in accordance with this exemplary example retains details of controls corresponding to the number of authenticated devices and the number of unauthenticated devices in the control condition retention unit 150. Then, the function control unit 140 specifies details of control according to the number of authenticated devices and the number of unauthenticated devices by referring to the control condition retention unit 150, and controls various functions (11 to 13) based on the specified details of control. In this way, the communication device 10 in accordance with this exemplary example can control various functions (11 to 13) according to environmental situations of the communication device 10.

Second Exemplary Embodiment

Next, a second exemplary embodiment of the present invention is explained hereinafter.

As shown in FIG. 6, a control device 200 in accordance with a second exemplary embodiment counts the number of reception signals received from an external device 900-1 to 900-n, and halts communication with the external device 900-1 to 900-n according to the counted reception signals.

In this way, when a number of external devices 900-1 to 900-n exist outside the control device 200, communication with an unintended external device 900-1 to 900-n can be avoided, and thus making it possible to improve the security. Details of a control system in accordance with this exemplary embodiment are explained hereinafter with reference to FIG. 6.

<System Configuration of Control System>

Firstly, a system configuration of a control system in accordance with this exemplary embodiment of the present invention is explained hereinafter with reference to FIG. 6.

The control system in accordance with this exemplary embodiment includes a control device 200 and an external device(s) 900-1 to 900-n (n is an arbitrary integer).

<Internal Configuration of Control Device: 200>

Next, an internal configuration of a control device 200 in accordance with this exemplary embodiment is explained with reference to FIG. 6.

The control device 200 in accordance with this exemplary embodiment includes a communication unit 210, a count unit 220, and a communication control unit 230.

The communication unit 210 receives a signal transmitted from an external device 900-1 to 900-n and communicates with an external device 900-1 to 900-n.

The count unit 220 counts the number of reception signals received by the communication unit 210.

The communication control unit 230 controls communication. Note that the communication control unit 230 halts communication with an external device 900-1 to 900-n according to the number of reception signals counted by the count unit 220.

For example, the communication control unit 230 halts communication with an external device 900-1 to 900-n when the number of reception signals counted by the count unit 220 exceeds a certain number.

Further, the communication control unit 230 stops responding to a reception signal received from an external device 900-1 to 900-n when the number of reception signals counted by the count unit 220 exceeds a certain number within a predetermined time.

<Process Operation in Control Device: 200>

Next, process operations in the control device 200 in accordance with this exemplary embodiment are explained hereinafter with reference to FIG. 6.

Firstly, when the communication unit 210 receives a signal from an external device 900-1 to 900-n, the communication unit 210 notifies the received signal to the count unit 220.

The count unit 220 counts the number of reception signals notified from the communication unit 210, and notifies the communication control unit 230 that the communication with the external device 900-1 to 900-n should be stopped according to the counted number of reception signals.

For example, the count unit 220 notifies the communication control unit 230 that the communication should be stopped when the number of reception signals exceeds a certain number.

When the communication control unit 230 receives a notice indicating that the communication should be stopped from the count unit 220, the communication control unit 230 stops the communication with the external device 900-1 to 900-n by controlling the communication unit 210.

As described above, the control device 200 in accordance with this exemplary embodiment counts the number of reception signals received from an external device 900-1 to 900-n, and stops communication with the external device 900-1 to 900-n according to the counted number of reception signals.

In this way, in accordance with this exemplary embodiment, when a number of external devices 900-1 to 900-n exist outside the control device 200, the control device 200 can avoid communicating with an unintended external device 900-1 to 900-n, and thus making it possible to improve the security.

Further, since unnecessary communication can be suppressed by avoiding unintended communication with external devices 900-1 to 900-n, it is possible to achieve lower power consumption of the control device 200.

Note that in the above-described control device 200 in accordance with this exemplary embodiment, the count unit 220 notifies the communication control unit 230 that the communication should be stopped when the number of reception signals exceeds a certain number. Then, upon receiving the notice indicating that the communication should be stopped from the count unit 220, the communication control unit 230 stops the communication with the external device 900-1 to 900-n by controlling the communication unit 210.

However, the control device 200 in accordance with this exemplary embodiment can be also constructed in the following manner. Firstly, when the number of reception signals exceeds a certain number within a predetermined set time, the count unit 220 notifies the communication control unit 230 that a response to a reception signal received from the external device 900-1 to 900-n should be halted. Then, upon receiving the notice indicating that the response should be stopped from the count unit 220, the communication control unit 230 stops responding to a reception signal received from the external device 900-1 to 900-n by controlling the communication unit 210.

<Internal Configuration of Count Unit: 220>

Next, an internal configuration of the count unit 220 in accordance with this exemplary embodiment is explained with reference to FIG. 7.

The count unit 220 in accordance with this exemplary embodiment includes a timer 221, a counter 222, a reference value retention unit 223, and a decision unit 224.

The counter 222 counts the number of reception signals notified from the communication unit 210, refers to the timer 221 at regular intervals, and when a predetermined time has elapsed, notifies the above-mentioned counted number of reception signals to the decision unit 224.

The reference value retention unit 223 retains an execution reference value that is used to perform communication stop control, and the decision unit 224 compares the number of reception signals notified from the counter 222 with the execution reference value retained in the reference value retention unit 223. Then, when the number of reception signals notified from the counter 222 is larger than or equal to the execution reference value, the decision unit 224 notifies the communication control unit 230 that the communication should be stopped. The execution reference value retained in the reference value retention unit 223 in accordance with this exemplary embodiment is a value corresponding to the frequency of communication.

When the communication control unit 230 receives a notice indicating that the communication should be stopped from the decision unit 224, the communication control unit 230 stops the communication with the external device 900-1 to 900-$n$ by halting the communication unit 210.

As described above, when the number of reception signals exceeds a certain number within a predetermined time, the count unit 220 in accordance with this exemplary embodiment can perform control so that the communication with the external device 900-1 to 900-$n$ is halted.

Note that the count unit 220 in accordance with this exemplary embodiment can perform control so as to stop a response to a reception signal received from the external device 900-1 to 900-$n$ when the number of reception signals exceeds a certain number within a predetermined time.

Third Exemplary Embodiment

Next, a third exemplary embodiment of the present invention is explained.

In the third exemplary embodiment, when there is an external device 900-1 to 900-$n$ for which the number of reception signals exceeds a certain number, the control device 200 halts communication with the external device 900-1 to 900-$n$.

In this way, when a number of external devices 900-1 to 900-$n$ exist outside the control device 200, communication with an unintended external device 900-1 to 900-$n$ can be avoided, and thus making it possible to improve the security. Details of a control system in accordance with this exemplary embodiment are explained hereinafter with reference to FIG. 8.

<System Configuration of Control System>

A control system in accordance with this exemplary embodiment of the present invention is configured in a similar manner to that of the control system in accordance with the second exemplary embodiment shown in FIG. 6.

<Internal Configuration of Count Unit: 220>

Next, an internal configuration of the count unit 220 in accordance with this exemplary embodiment is explained with reference to FIG. 8.

The count unit 220 in accordance with this exemplary embodiment includes an identification unit 225, an identification information retention unit 226, a timer 221, a counter 222, a reference value retention unit 223, and a decision unit 224.

When identification information is contained in a reception signal notified from the communication unit 210, the identification unit 225 extracts the identification information and notifies the extracted identification information to the identification information retention unit 226. The identification information is information used to specify an external device 900-1 to 900-$n$.

When the identification information retention unit 226 receives identification information from the identification unit 225, it refers to the timer 221, acquires time information, and retains the identification information together with the time information.

Further, the identification information retention unit 226 refers to the timer 221 and acquires time information at regular intervals. Then, the identification information retention unit 226 compares the time information acquired from the timer 221 with the time information retained with the identification information in the identification information retention unit 226, and by doing so, deletes identification information for which a predetermined set time has elapsed from the identification information retention unit 226.

The counter 222 refers to the identification information retention unit 226 at regular intervals, counts the number of identification information pieces retained in the identification information retention unit 226, and notifies it to the decision unit 224.

The reference value retention unit 223 retains an execution reference value that is used to perform communication stop control. Further, the decision unit 224 compares the number of identification information pieces notified from the counter 222 with the execution reference value retained in the reference value retention unit 223, and when the number of identification information pieces notified from the counter 222 is larger than or equal to the execution reference value, notifies the communication control unit 230 that the communication should be stopped.

When the communication control unit 230 receives a notice indicating that the communication should be stopped from the decision unit 224, the communication control unit 230 stops the communication with the external device 900-1 to 900-$n$ by halting the communication unit 210.

As described above, the control device 200 in accordance with this exemplary embodiment counts the number of external devices 900-1 to 900-$n$ based on identification information contained in reception signals received from the external devices 900-1 to 900-$n$, and halts communication with the external device 900-1 to 900-$n$ according to the number of the external devices 900-1 to 900-$n$.

For example, the control device 200 halts communication with external devices 900-1 to 900-$n$ when the number of the external devices 900-1 to 900-$n$ exceeds a certain number.

Further, the control device 200 stops responding to a reception signal when the number of the external devices 900-1 to 900-$n$ exceeds a certain number within a predetermined time.

In this way, when a number of external devices 900-1 to 900-$n$ exist outside the control device 200, communication with an unintended external device 900-1 to 900-$n$ can be avoided, and thus making it possible to improve the security.

Further, since unnecessary communication can be suppressed by avoiding unintended communication with external devices 900-1 to 900-$n$, it is possible to achieve lower power consumption of the control device 200.

First Exemplary Example

Next, explanation is made by using an example where the above-described control device 200 is installed in an IC card.

In the case where the above-described control device 200 is installed in an IC card, the communication unit 210 corresponds to the antenna and the modulation/demodulation circuit of the IC card and the external device 900-1 to 900-$n$ corresponds to a reader/writer device.

When the communication unit 210 in accordance with this exemplary example receives a request signal such as a read signal and a write signal from the reader/writer device, the communication unit 210 notifies the request signal to the count unit 220.

Assume that the IC card in accordance with this exemplary example simultaneously communicates with only one reader/writer device. Therefore, the reference value retention unit 223 retains "2" as an execution reference value used to perform communication stop control, so that when there are two or more reader/writer devices to be communicated with, the reference value retention unit 223 performs control so as to stop the communication.

Note that if the IC card is used for one reader/writer device, the identification information retention unit 226 retains identification information only for one device. Therefore, the counter 222 notifies "1" to the decision unit 224.

The decision unit 224 compares the number of identification information pieces, i.e., "1" with the execution reference value "2" retained in the reference value retention unit 223. Since the number of identification information pieces notified from the counter 222, i.e., "1" is not larger than or equal to the execution reference value "2", the decision unit 224 does not notify the communication control unit 230 that the communication should be stopped.

However, when a second reader/writer device is placed in the vicinity of the above-mentioned first reader/writer device and the communication unit 210 receives a request signal from the second reader/writer device, the identification information retention unit 226 retains identification information for two devices. Therefore, the counter 222 notifies "2" to the decision unit 224.

The decision unit 224 compares the number of identification information pieces notified from the counter 222, i.e., "2" with the execution reference value "2" retained in the reference value retention unit 223. Since the number of identification information pieces notified from the counter 222, i.e., "2" is larger than or equal to the execution reference value "2", the decision unit 224 notifies the communication control unit 230 that the communication should be stopped. In this way, the communication control unit 230 stops the communication by halting the communication unit 210.

In this manner, the control device 200 can prevent the IC card from performing unintended control because of the unnecessary second reader/writer device.

Second Exemplary Example

Next, explanation is made by using an example where the above-described control device 200 is installed in a reader/writer device for an IC card.

In the case where the above-described control device 200 is installed in a reader/writer device, the communication unit 210 corresponds to the antenna and the modulation/demodulation circuit of the reader/writer device and the external device 900-1 to 900-n corresponds to an IC card.

The basic operations of this exemplary example are similar to those of the first exemplary example except that in this exemplary example, when identification information for two or more IC cards are received, the reader/writer device stops the communication, and therefore data acquisition from and data writing by other unintended IC cards can be avoided.

Third Exemplary Example

Next, explanation is made by using an example where the above-described control device 200 is installed in an IC chip of a compact and easy-to-carry wireless device such as a mobile phone device and a reader/writer device.

The basic operations of this exemplary example are similar to those of the first and second exemplary examples except that in this exemplary example, the set value retained in the reference value retention unit 223 can be arbitrarily changed.

For example, when data exchange is to be carried out simultaneously with a plurality of friends (e.g., three friends), the value retained in the reference value retention unit 223 is set to "3" so as to conform to the number of friends, whereas in all other situations, the value retained in the reference value retention unit 223 is set to "2" so that the device communicates with only one other device.

In this way, while it is possible to perform data exchange with a plurality of friends, it is also possible to avoid communicating with an unintended person in a situation where two or more external devices that are possessed by other people and capable of carrying out wireless communication exist within the communication range such as in a crowded train.

Note that the above-described exemplary embodiments are preferable exemplary embodiments of the present inventions and are not ones to restrict the scope of the present invention to the above-mentioned exemplary embodiments. Further, those skilled in the art can make corrections and replacements on the above-mentioned exemplary embodiments and construct other embodiments to which various modifications made without departing from the spirit and scope of the present invention.

For example, the authentication method of the above-mentioned exemplary examples is not limited to methods using a common key, and various authentication methods can be applied depending on the intended purpose.

Further, with regard to the details of controls to control various functions, they are not limited to the voice call function 11, the telephone book function 12, and the user-interface function 13 explained with the exemplary example shown in FIG. 4, and the system can be constructed to control every possible function.

Examples of the function include generation of a sound or display of a message for a warning, a call to a specific telephone number, and display of contact information. Further, examples also include dispatch of an email to a specific destination, accessing to a specific website, and notification of a device status to a specific server.

Further, the system can be also constructed such that the owner of the communication device can arbitrarily set various functions that are controlled according to the number of authenticated devices and the number of unauthenticated devices so that the details of controls according to the owner are performed.

Further, a control system in accordance with this exemplary embodiment is applicable to every possible communication device regardless of it is a wired device or wireless device. For example, it is applicable to long-distance radio communication in which the communication range of the control device is larger than several hundred meters, short-distance radio communication for which the communication range is less than or equal to several meters, and wired communication for which the communication range is limited. Note that a control system in accordance with this exemplary embodiment is especially effective in short-distance radio communication in which the communication range of the control device is from several dozen meters to several hundred meters.

Further, control operations in each device constituting a control system in accordance with above-described this exemplary embodiment of the present invention can be implemented by hardware, software, or a combination thereof.

Note that when processes are performed by software, it is possible to install a program in which a process sequence is recorded into a memory within a computer embedded in purpose-built hardware and execute the program. Alternatively, it is also possible to install and execute a program in a general-purpose computer capable of various processes.

For example, a program can be recorded in advance in a hard disk drive or a ROM (Read Only Memory) used as a recording medium. Alternatively, a program can be temporarily or permanently stored (recorded) in a removable recording medium. It is possible to provide a removable recording medium like this as the so-called "packaged software". Examples of the removable recording medium include a floppy (registered trademark) disk, a CD-ROM (Compact Disc Read Only Memory), a MO (Magneto optical) disk, a DVD (Digital Versatile Disc), a magnetic disk, and a semiconductor memory.

It should be noted that the program may be installed from the above-described removable recording medium into a computer. Further, it may be wirelessly transferred from a download site into a computer. Further, it may be transferred in a wired manner to a computer through a network.

Further, in addition to executing in a time series in accordance with processing operations explained with the above-described exemplary embodiments, it is also possible to construct so that they are executed in parallel or in an individual manner according to the processing capacity of an apparatus that executes the process or according to the necessity.

Further, the control system explained with above-mentioned exemplary embodiments can be constructed as a logical assembly of a plurality of devices, or constructed in a structure where each structural device is housed in the same housing.

Note that this application is the National Phase of PCT/JP2008/062894, filed Jul. 17, 2008, which is based upon and claims the benefit of priority from Japanese patent application No. 2007-189365, filed on Jul. 20, 2007, the disclosure of which is incorporated herein in its entirety by reference.

INDUSTRIAL APPLICABILITY

The present invention is applicable to services to control various functions according to the number of external devices existing outside of the device.

BRIEF DESCRIPTION OF DRAWINGS

FIG. 3 shows an example of details of controls retained by a control condition retention unit 150 of a control device 100 shown in FIG. 2;

FIG. 5 shows an example of details of controls retained by a control condition retention unit 150 of a control device 100 shown in FIG. 4;

EXPLANATION OF REFERENCE

Figure 1:
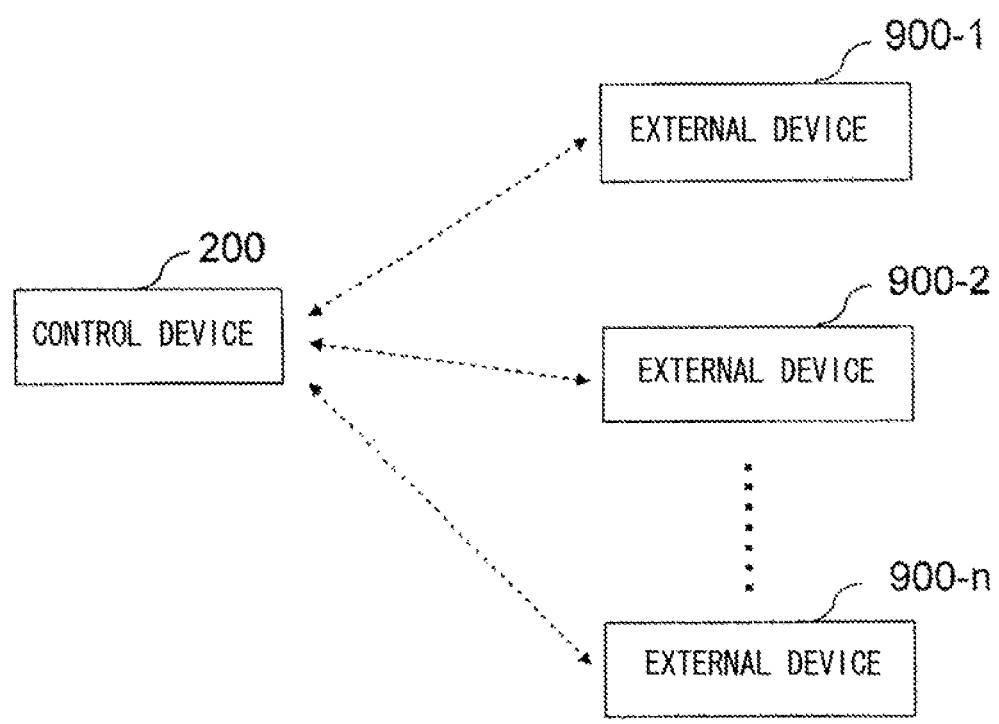
FIG. 1 is a diagram for explaining an outline of a control system in accordance with this exemplary embodiment.
Figure 2:
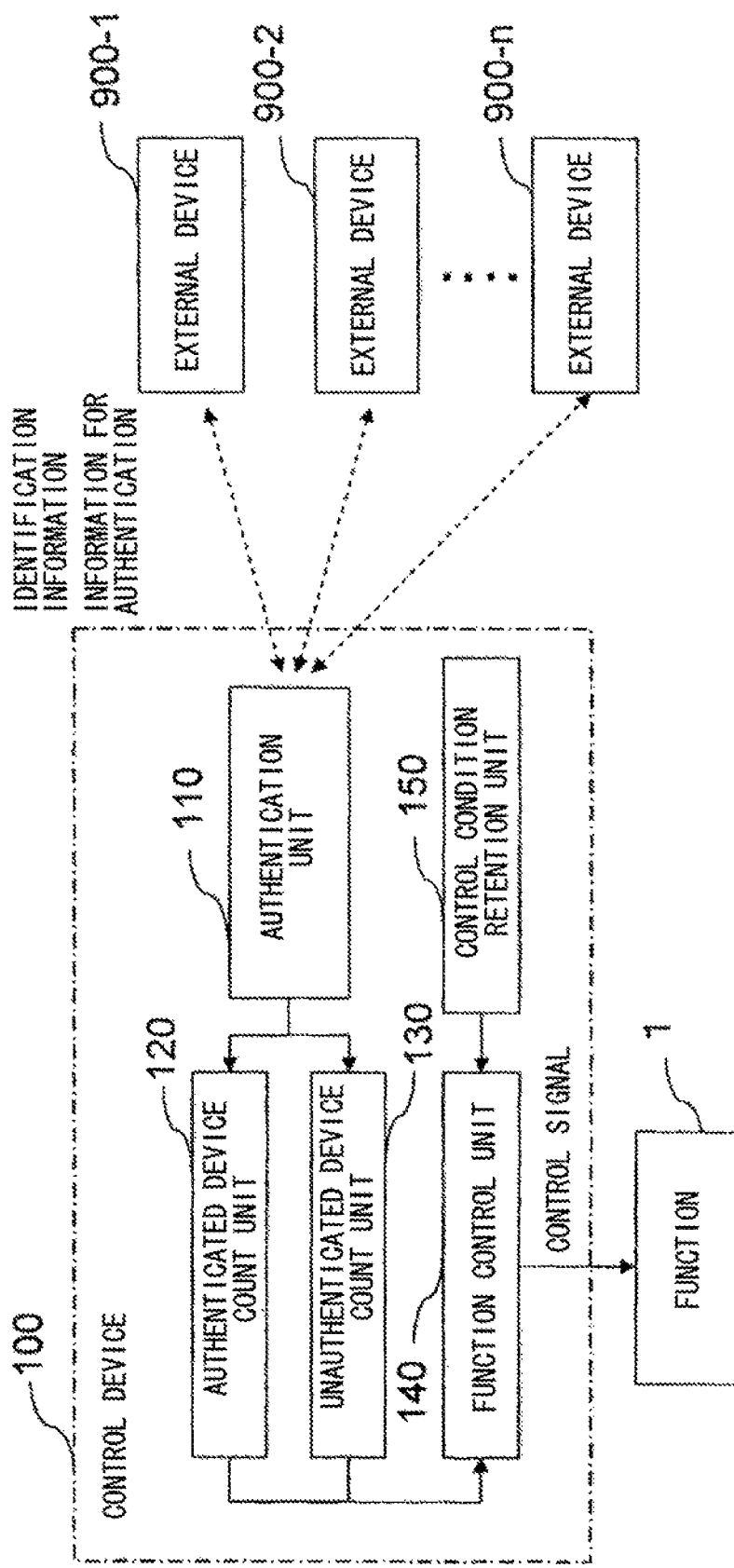
FIG. 2 shows an example of a system configuration of a control system in accordance with a first exemplary embodiment.
Figure 4:
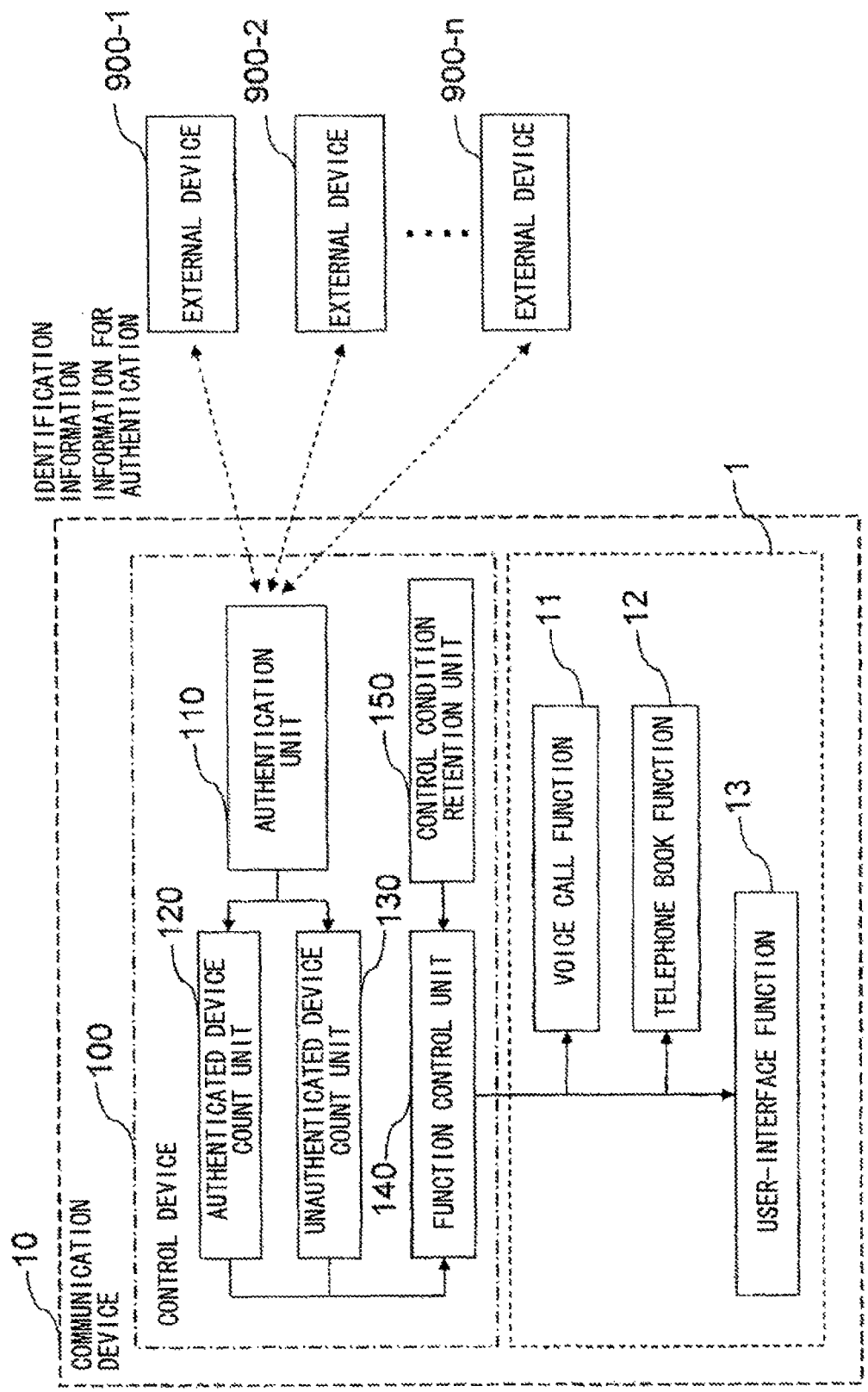
FIG. 4 shows a configuration example of a communication device 10 in which a control device 100 in accordance with a first exemplary embodiment is installed.
Figure 6:
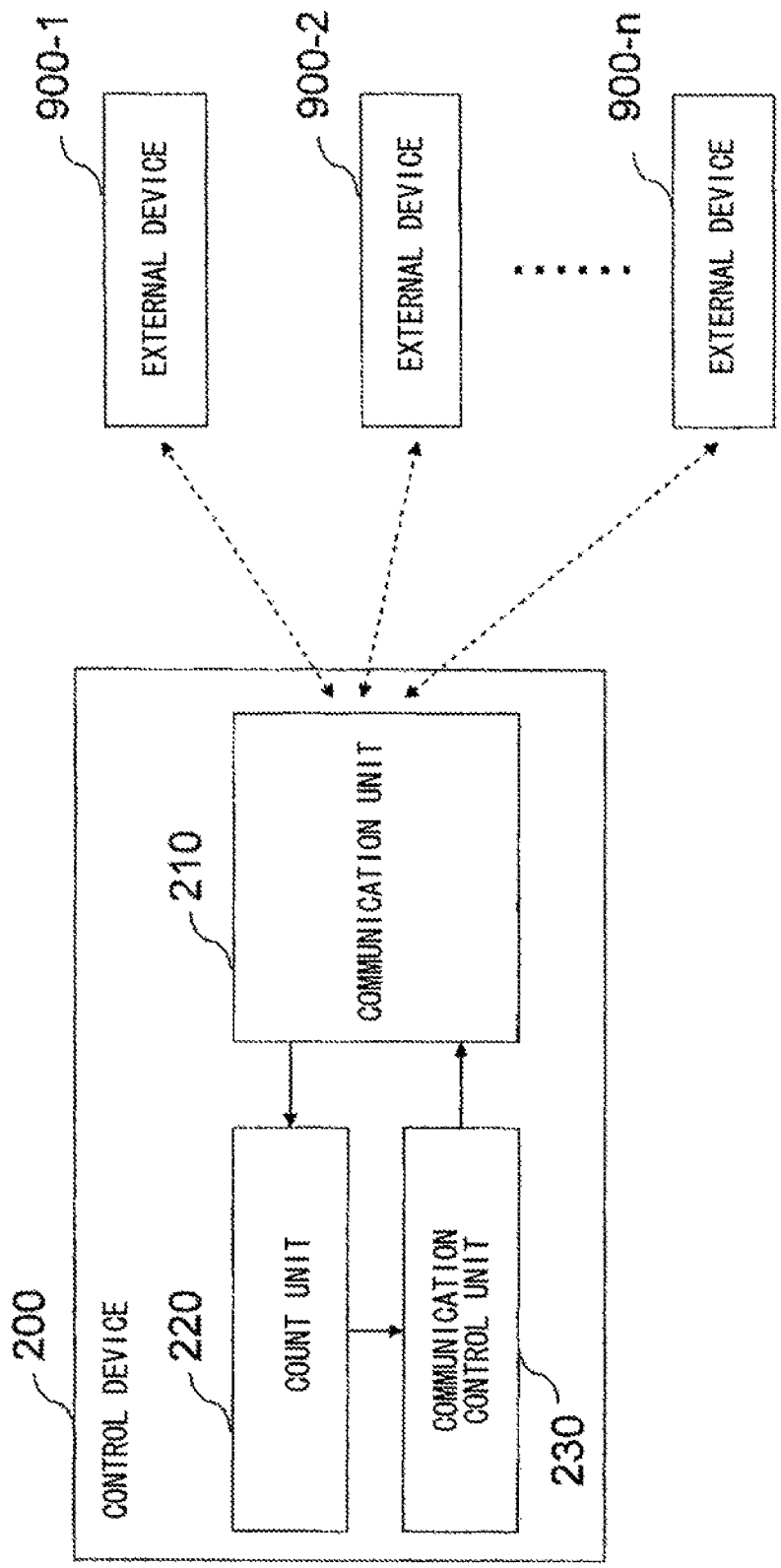
FIG. 6 shows an example of a system configuration of a control system in accordance with a second exemplary embodiment.
Figure 7:
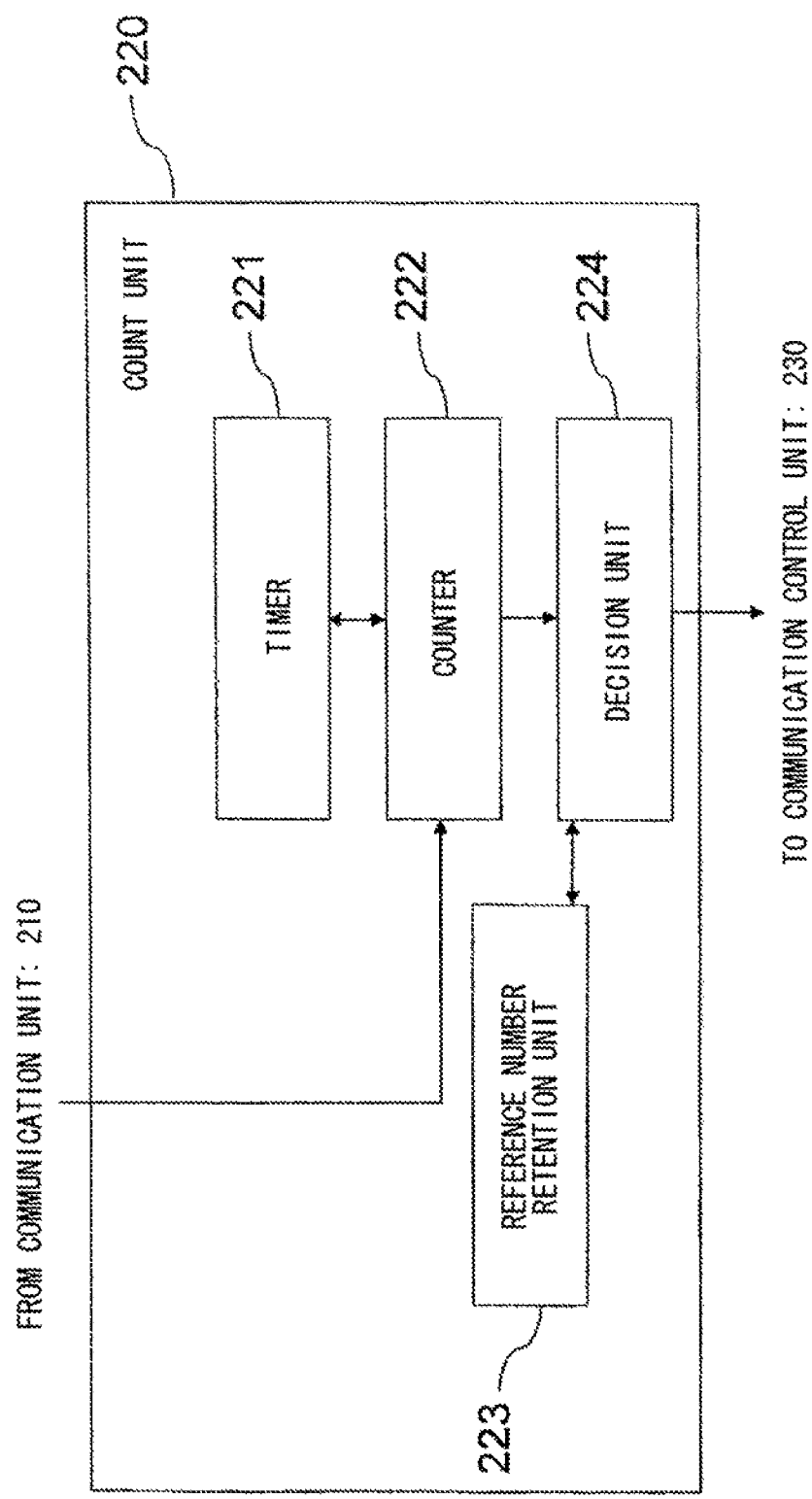
FIG. 7 shows an example of an internal configuration of a count unit 220 of a control device 200 constituting a control system in accordance with a second exemplary embodiment.
Figure 8:
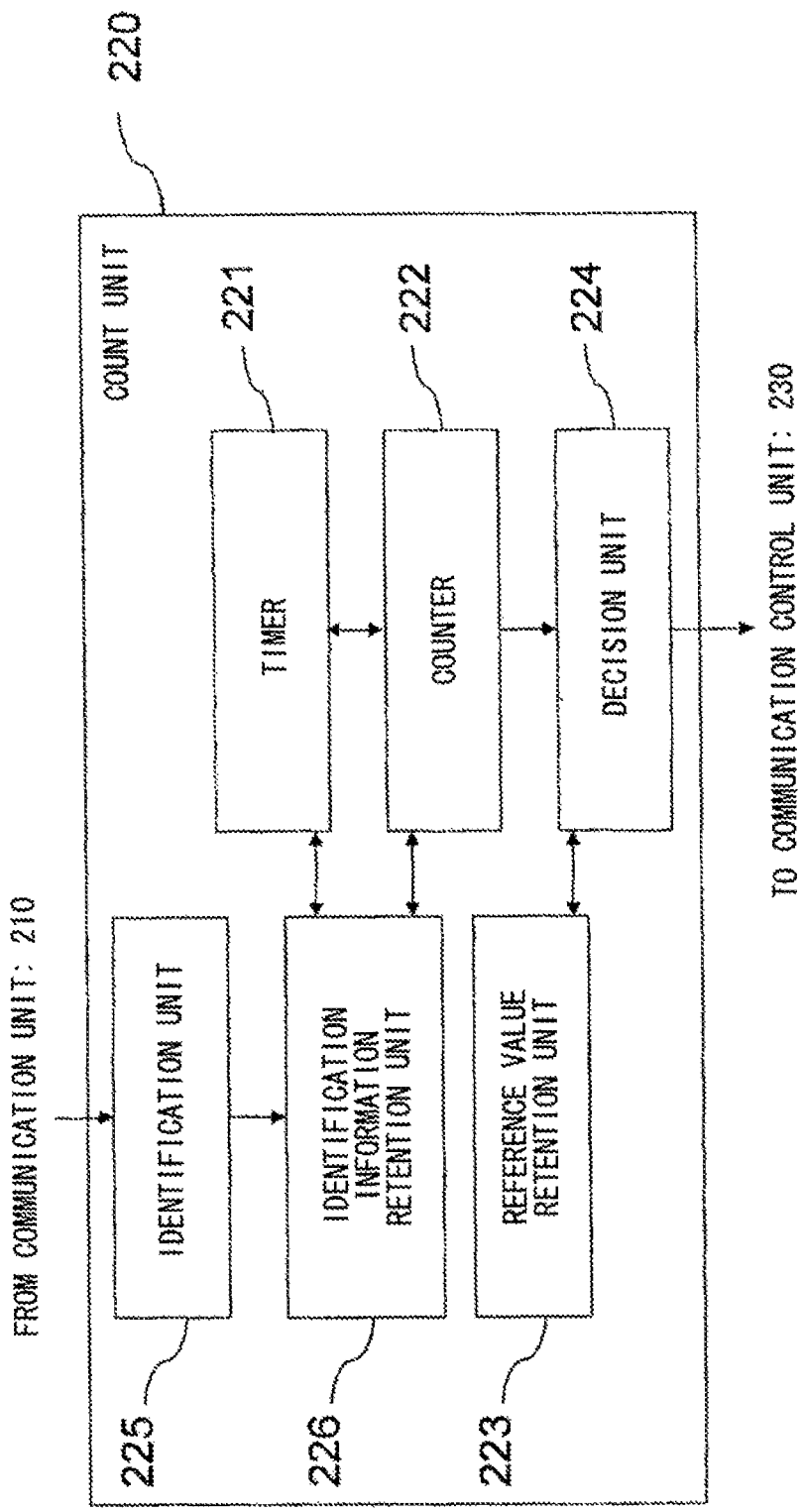
FIG. 8 shows an example of an internal configuration of a count unit 220 of a control device 200 constituting a control system in accordance with a third exemplary embodiment.

100 CONTROL DEVICE
110 AUTHENTICATION UNIT
120 AUTHENTICATED DEVICE COUNT UNIT
130 UNAUTHENTICATED DEVICE COUNT UNIT
140 FUNCTION CONTROL UNIT
150 CONTROL CONDITION RETENTION UNIT
900-1-900-n EXTERNAL DEVICE
1 FUNCTION
11 VOICE CALL FUNCTION
12 TELEPHONE BOOK FUNCTION
13 USER-INTERFACE FUNCTION
200 CONTROL DEVICE
210 COMMUNICATION UNIT
220 COUNT UNIT
221 TIMER
222 COUNTER
223 REFERENCE VALUE RETENTION UNIT
224 DECISION UNIT
225 IDENTIFICATION UNIT
226 IDENTIFICATION INFORMATION RETENTION UNIT
230 COMMUNICATION CONTROL UNIT

The invention claimed is:

1. A control device that controls at least one function, comprising:

a count unit that counts a number of reception signals received from an external device existing outside the control device;

an authentication unit that identifies the external device as an authenticated device or an unauthenticated device by using pre-stored information for authentication and information extracted from the reception signal;

a control condition retention unit that retains a condition that is set based on a number of authenticated devices and a number of unauthenticated devices, and a control content for controlling the at least one function according to the condition in such a manner that the condition and the control content are associated with each other; and a function control unit that specifies the control content and controls the at least one function based on a counting result by the count unit, and wherein the count unit comprises:

an identification unit that extracts identification information from the reception signals;

an identification information retention unit that receives the identification information from the identification unit, retains the identification information and time information at which the identification information is received, and deletes identification information for which a predetermined set time has elapsed;

a counter that refers to the identification information retention unit at arbitrary time intervals and counts a number of retained identification information pieces; and a decision unit that is notified of the number of identification information pieces, and determines a stop of communication according to the number of identification information pieces and notifies the function control unit of the stop of communication, wherein the counter comprises:

an authenticated device count unit that counts a number of authenticated devices identified by the authentication unit and retains the counted number; and an unauthenticated device count unit that counts a number of unauthenticated devices identified by the authentication unit and retains the counted number, and wherein the function control unit specifies the control content by using the counting result by the counting unit, the counting result by the counting unit including at least one of a decision result notified from the decision unit, the number of authenticate devices retained by the authenticated device count unit, and the number of unauthenticated devices retained by the unauthenticated device count unit, and thereby controls the at least one function.

2. A control system comprising a control device that controls at least one function, and at least one external device existing outside the control device, wherein
the control device comprises:
a count unit that counts a number of reception signals received from the external device;
an authentication unit that identifies the external device as an authenticated device or an unauthenticated device by using pre-stored information for authentication and information extracted from the reception signal;
a control condition retention unit that retains a condition that is set based on a number of authenticated devices and a number of unauthenticated devices, and a control content for controlling the at least one function according to the condition in such a manner that the condition and the control content are associated with each other; and
a function control unit that specifies the control content and controls the at least one function based on a counting result by the count unit, and
wherein the count unit comprises:
an identification unit that extracts identification information from the reception signals;
an identification information retention unit that receives the identification information from the identification unit, retains the identification information and time information at which the identification information is received, and deletes identification information for which a predetermined set time has elapsed;
a counter that refers to the identification information retention unit at arbitrary time intervals and counts a number of retained identification information pieces; and
a decision unit that is notified of the number of identification information pieces, and determines a stop of communication according to the number of identification information pieces and notifies the function control unit of the stop of communication,
wherein the counter comprises:
an authenticated device count unit that counts a number of authenticated devices identified by the authentication unit and retains the counted number; and
an unauthenticated device count unit that counts a number of unauthenticated devices identified by the authentication unit and retains the counted number, and
wherein the function control unit specifies the control content by using the counting result by the counting unit, the counting result by the counting unit including at least one of a decision result notified from the decision unit, the number of authenticate devices retained by the authenticated device count unit, and the number of unauthenticated devices retained by the unauthenticated device count unit, and thereby controls the at least one function.

3. A control method carried out by a control device that controls at least one function, comprising steps of:
counting a number of reception signals received from an external device existing outside the control device;
identifying the external device as an authenticated device or an unauthenticated device by using pre-stored information for authentication and information extracted from the reception signal;
retaining a condition that is set based on a number of authenticated devices and a number of unauthenticated devices, and a control content for controlling the at least one function according to the condition in such a manner that the condition and the control content are associated with each other; and
specifying the control content and controlling the at least one function based on a counting result by the count unit, and
wherein counting a number of reception signals comprises:
extracting identification information from the reception signals;
receiving the identification information;
retaining the identification information and time information at which the identification information is received;
deleting identification information for which a predetermined set time has elapsed;
referring to the retained identification information pieces at arbitrary time intervals and counting a number of retained identification information pieces; and
determining a stop of communication according to the number of retained identification information pieces and notifying the stop of communication, and
wherein counting a number of reception signals comprises steps of:
counting a number of authenticated devices and retaining the counted number; and
counting a number of unauthenticated devices and retaining the counted number, and
wherein specifying the control content is achieved by using a counting result, the counting result including at least one of a decision result notified from the determining step, the number of authenticated devices retained by the step of counting the number of authenticated devices and the number of unauthenticated devices retained by the step of counting the number of unauthenticated devices, and thereby controlling the at least one function.

4. A storage medium having a control program recorded therein, the control program being adapted to be executed in a control device that controls at least one function and to cause the control device to perform;
a counting process to count a number of reception signals received from an external device existing outside the control device;
an authentication process to identify the external device as an authenticated device or an unauthenticated device by using pre-stored information for authentication and information extracted from the reception signal;
a control condition retention process to retain a condition that is set based on a number of authenticated devices and a number of unauthenticated devices, and a control content for controlling the at least one function according to the condition in such a manner that the condition and the control content are associated with each other; and
a function control process to specify the control content and controls the at least one function based on a counting result by the counting process, and
wherein the counting process to count a number of reception signals comprises:
an extracting process to extract identification information from the reception signals;
a receiving process to receive the identification information;
a retaining process to retain the identification information and time information at which the identification information is received;
a deleting process to delete identification information for which a predetermined set time has elapsed;

a referring process to refer to the retained identification information pieces at arbitrary time intervals and count a number of retained identification information pieces; and a determining process to determine a stop of communication according to the number of retained identification information pieces and to notify the function control process of the stop of communication, and wherein the counting process comprises:

an authenticated device counting process to count a number of authenticated devices identified by the authentication process and to retain the counted number; and an unauthenticated device counting process to count a number of unauthenticated devices identified by the authentication process and to retain the counted number, and wherein the function control process specifies the control content by using the counting result by the counting process, the counting result by the counting process including at least one of a decision result notified from the determining process, the number of authenticated devices retained by the authenticated device counting process, and the number of unauthenticated devices retained by the unauthenticated device counting process, and thereby controls the at least one function.

5. A control device that controls at least one function, comprising:

a count means for counting a number of reception signals received from an external device existing outside the control device; and an authentication means that identifies the external device as an authenticated device or an unauthenticated device by using pre-stored information for authentication and information extracted from the reception signal;

a control condition retention means that retains a condition that is set based on a number of authenticated devices and a number of unauthenticated devices, and a control content for controlling the at least one function according to the condition in such a manner that the condition and the control content are associated with each other; and a function control means that specifies the control content and controls the at least one function based on a counting result by the count means, and wherein the count means comprises:

an identification means that extracts identification information from the reception signals;

identification information retention means that receives the identification information from the identification unit, retains the identification information and time information at which the identification information is received, and deletes identification information for which a predetermined set time has elapsed;

a counter means that refers to the identification information retention means at arbitrary time intervals and counts a number of retained identification information pieces; and a decision means that is notified of the number of identification information pieces, and determines a stop of communication according to the number of identification information pieces and notifies the function control means of the stop of communication, and wherein the counter means comprises:

an authenticated device count means that counts a number of authenticated devices identified by the authentication means and retains the counted number; and an unauthenticated device count means that counts a number of unauthenticated devices identified by the authentication means and retains the counted number, and wherein the function control means specifies the control content by using the counting result by the counting means, the counting result by the counting means including at least one of a decision result notified from the decision means, the number of authenticated devices retained by the authenticated device count means, and the number of unauthenticated devices retained by the unauthenticated device count means, and thereby controls the at least one function.

\* \* \* \* \*